United States Patent [19]
Willett et al.

[11] Patent Number: 6,136,398
[45] Date of Patent: Oct. 24, 2000

[54] ENERGY CURED SEALANT COMPOSITION

[75] Inventors: Peggy S. Willett, Stillwater; Christopher M. Meyer; Scott R. Meyer, both of Woodbury, all of Minn.

[73] Assignee: 3M Innovative Properties Company, St. Paul, Minn.

[21] Appl. No.: 09/071,267

[22] Filed: May 1, 1998

[51] Int. Cl.⁷ ....................................................... B32B 9/04
[52] U.S. Cl. ....................... 428/41.3; 428/41.7; 428/41.8; 525/107; 525/113; 525/177; 525/438
[58] Field of Search .................................... 525/107, 113, 525/120, 177, 438; 428/41.3, 41.7, 41.8

[56] References Cited

U.S. PATENT DOCUMENTS

| | | |
|---|---|---|
| 2,071,549 | 2/1937 | Mahlman . |
| 2,128,905 | 8/1938 | Benner et al. . |
| 2,128,907 | 9/1938 | Benner et al. . |
| 2,958,593 | 11/1960 | Hoover et al. . |
| 3,018,262 | 1/1962 | Schroeder . |
| 3,117,099 | 1/1964 | Proops et al. . |
| 3,464,948 | 9/1969 | Russell . |
| 3,641,195 | 2/1972 | Ball et al. . |
| 4,009,224 | 2/1977 | Warnken . |
| 4,026,705 | 5/1977 | Crivello et al. . |
| 4,028,393 | 6/1977 | Rottloff et al. . |
| 4,058,401 | 11/1977 | Crivello . |
| 4,173,476 | 11/1979 | Smith et al. . |
| 4,250,053 | 2/1981 | Smith . |
| 4,256,828 | 3/1981 | Smith . |
| 4,312,902 | 1/1982 | Murase et al. . |
| 4,427,481 | 1/1984 | Smith et al. . |
| 4,517,340 | 5/1985 | Read et al. . |
| 4,560,579 | 12/1985 | Siadat et al. . |
| 4,612,209 | 9/1986 | Forgo et al. . |
| 4,652,275 | 3/1987 | Bloecher et al. . |
| 4,684,678 | 8/1987 | Schultz et al. . |
| 4,693,775 | 9/1987 | Harrison et al. . |
| 4,708,996 | 11/1987 | Hoffman et al. . |
| 4,751,138 | 6/1988 | Tumey et al. . |
| 4,789,712 | 12/1988 | Hoffman et al. . |
| 4,799,939 | 1/1989 | Bloecher et al. . |
| 4,850,871 | 7/1989 | Bryan . |
| 4,903,440 | 2/1990 | Larson et al. . |
| 4,920,182 | 4/1990 | Manser et al. . |
| 4,933,219 | 6/1990 | Sakumoto et al. . |
| 4,991,362 | 2/1991 | Heyer et al. . |
| 4,997,717 | 3/1991 | Rembold et al. . |
| 5,059,701 | 10/1991 | Keipert . |
| 5,071,914 | 12/1991 | Zimmel et al. . |
| 5,089,536 | 2/1992 | Palazzotto . |
| 5,095,046 | 3/1992 | Tse . |
| 5,191,101 | 3/1993 | Palazzotto et al. . |
| 5,215,860 | 6/1993 | McCormick et al. . |
| 5,236,472 | 8/1993 | Kirk et al. . |
| 5,242,980 | 9/1993 | Tse . |
| 5,252,694 | 10/1993 | Willett et al. . |
| 5,294,517 | 3/1994 | McCormick et al. . |
| 5,387,492 | 2/1995 | McCormick et al. . |
| 5,407,978 | 4/1995 | Bymark et al. . |
| 5,436,063 | 7/1995 | Follett et al. . |
| 5,507,850 | 4/1996 | Helmin . |
| 5,523,152 | 6/1996 | Thurber et al. . |
| 5,558,911 | 9/1996 | Blum . |
| 5,703,198 | 12/1997 | Twigt et al. . |
| 5,704,952 | 1/1998 | Law et al. . |
| 5,709,948 | 1/1998 | Perez et al. . |

FOREIGN PATENT DOCUMENTS

| | | |
|---|---|---|
| 0 209 859 | 1/1987 | European Pat. Off. . |
| 0 281 354 | 9/1988 | European Pat. Off. .......... C09D 5/02 |
| 0 289 632 A1 | 11/1988 | European Pat. Off. . |
| 289 632 | 11/1988 | European Pat. Off. . |
| 0 396 150 | 11/1990 | European Pat. Off. . |
| 0 447 115 A1 | 9/1991 | European Pat. Off. . |
| 0 486 308 A2 | 5/1992 | European Pat. Off. . |
| 0 500 009 A1 | 8/1992 | European Pat. Off. . |
| 0 560 018 | 9/1993 | European Pat. Off. . |
| 0 620 259 A2 | 10/1994 | European Pat. Off. . |
| 620 259 | 10/1994 | European Pat. Off. . |
| 0 654 323 | 5/1995 | European Pat. Off. . |
| 0 721 975 A1 | 7/1996 | European Pat. Off. . |
| 0 747 170 | 12/1996 | European Pat. Off. . |
| 0 819 747 A1 | 1/1998 | European Pat. Off. . |
| 3243383 | 5/1984 | Germany . |
| 39 38 376 | 5/1991 | Germany . |
| 19541923 | 5/1997 | Germany . |
| 53-042280 | 4/1978 | Japan . |
| 57-25379 | 2/1982 | Japan . |
| 60-137980 | 7/1985 | Japan . |
| 60-228527 | 11/1985 | Japan . |
| 1098660 | 4/1989 | Japan . |
| 52-75842 | 10/1993 | Japan . |
| 8-85780 | 4/1996 | Japan . |
| 09183957 | 7/1997 | Japan . |
| 9-176599 | 7/1997 | Japan . |
| 9-176600 | 7/1997 | Japan . |
| 9-235390 | 9/1997 | Japan . |
| 1183519 | 10/1985 | U.S.S.R. . |
| 2 091 736 | 8/1982 | United Kingdom . |
| 2 138 008 | 10/1984 | United Kingdom . |
| WO 92/20754 | 11/1992 | WIPO . |
| WO 93/11200 | 6/1993 | WIPO . |
| WO 93/23487 | 11/1993 | WIPO . |
| WO 97/12929 | 4/1997 | WIPO . |
| WO 97/25185 | 7/1997 | WIPO . |
| WO 97/42004 | 11/1997 | WIPO . |
| WO 98/12021 | 3/1998 | WIPO . |

OTHER PUBLICATIONS

Database WPI Section Ch, Week 8830 Derwent Publications Ltd., London, GB; Class A18, AN 88–209011 XP002107710 & JP 63 144964 A (Osaka Kongo Seito KK), Jun. 17, 1988.

Database WPI Section Ch, Week 8145 Derwent Publications Ltd., London, GB; Class A21, AN 81–82591D XP002107711 & JP 56 122823 A (Nitto Electric Ind Co), Sep. 26, 1981.

*Primary Examiner*—Robert Dawson
*Assistant Examiner*—D. Aylward
*Attorney, Agent, or Firm*—Melissa M. Hayworth; Scott A. Bardell

[57] ABSTRACT

A curable composition formed by mixing components comprising 10 to 70 weight percent of a curable epoxy resin; an effective amount of a curative for the epoxy resin; 10 to 85 weight percent of a thermoplastic ethylene-vinyl acetate copolymer; and 5 to 60 weight percent of a thermoplastic polyester resin, the parts by weight being based on the total weight of the resin in the composition.

26 Claims, No Drawings

ENERGY CURED SEALANT COMPOSITION

FIELD OF THE INVENTION

This invention relates to adhesive sealant compositions. More specifically, this invention relates to sealant compositions comprising thermoplastic resins and thermosetting resins prepared by curing the thermosetting resin; that is, an epoxy resin in the presence of thermoplastic polyester and ethylene-vinyl acetate resins. The invention also provides a method of preparing sealant compositions and sealant articles that feature 100 percent solids processing and latent- or post-curing of the epoxy resin, and uses for the sealant compositions produced by the method.

BACKGROUND OF THE INVENTION

Blends of curable epoxy resins with various thermoplastic polymers are known. For example, compositions comprising epoxy and polyester thermoplastic resins have been used as hot melt adhesives and in the manufacture of structural bonding and sealing tapes.

Latently curable compositions consisting of epoxy resins and thermoplastic polyesters have several deficiencies. For example, they can be prone to excessive flow prior to or during cure, unless flow control additives are incorporated. This excessive flow may result in a messy adhesive bond line that must be smoothed out in a subsequent step in cases where appearance is important (for example, exterior automotive applications such as trim adhesion, body panel, and door skin replacement) or it may lead to unevenness in thickness of the bond line (that is, seal) or to perforation (that is, blow-through) of the film by entrapped bubbles which may then be a source for water leaks. Further, in order to obtain good adhesion to painted metal substrates, it is often necessary to increase the epoxy content of the sealant composition above that level which otherwise achieves optimal properties. Also, epoxy-polyester sealant compositions known in the art having adequate flow properties typically lack sufficient tack to be used in the form of a thermosettable pressure-sensitive adhesive tape without a separate adhesive layer.

Epoxy material containing compositions having thermal catalysts or hardeners are typically difficult to melt process into articles (for example, tapes, films, or rods) without causing premature curing of the composition. Use of high temperature curatives that do not cause curing during such processing steps can cause excessive flow of the adhesive during cure, thereby resulting in defective bond or damage to the substrate to which it is to be bonded.

Other epoxy resin/thermoplastic resin blends provide films having inadequate tack or adhesion to vertical metal surfaces. One solution to this problem is to incorporate magnetic particles into the composition so to effect magnetic adhesion to the metal surface. The particles are added to the composition and then, in a separate step, are magnetized before the adhesive is used. However, this solution would not be effective for adhesion to polymer based substrates and adds expense and additional steps to the manufacturing process of adhesives for use on ferromagnetic substrates.

SUMMARY OF THE INVENTION

The present invention provides a curable sealing composition formed by mixing components comprising:
 a) 10 to 70 weight percent of a curable epoxy resin;
 b) an effective amount of a curative for the epoxy resin;
 c) 10 to 85 weight percent of a thermoplastic ethylene-vinyl acetate copolymer; and
 d) 5 to 60 weight percent of a thermoplastic polyester compatibilizing resin,
 wherein the sum of a), c), and d) above equals 100 weight percent (that is, exclusive of curative and other additives).

The compositions of the invention may also optionally contain a hydroxyl containing material having a hydroxyl functionality of at least one for tailoring the glass transition temperature and flexibility of the uncured compositions. The compositions of the invention may also contain up to 50 percent, preferably up to 30 percent, by volume of the total composition, various additives such as fillers, tackifiers, and the like.

In another aspect, the present invention describes an adhesive comprising a cured mixture of a thermally or photochemically cured epoxy resin, an ethylene-vinyl acetate copolymer, and a thermoplastic polyester.

In another aspect, the present invention describes a method of preparing a cured composition comprising the steps of:
 a) providing a molten mixture including 10 to 70 weight percent of a curable epoxy resin, an effective amount of a curative for the epoxy resin, 10 to 85 weight percent of a thermoplastic ethylene-vinyl acetate copolymer and 5 to 60 weight percent of a thermoplastic polyester compatibilizing resin, the weights being based on the total weight of the resin in the composition and equaling 100 weight percent;
 b) applying the mixture to a substrate or processing into an unsupported film; and
 c) at any subsequent time, activating the curative to produce a cured composition. The compositions of the invention may also be processed into protected films and tapes.

The compositions of the invention are free of polymeric hydrocarbons bearing essentially no organic functional groups, prepared from homopolymerization and/or copolymerization of an olefinic monomer(s).

The present invention overcomes the deficiencies of polyester-epoxy and EVA-epoxy adhesives and sealants by providing sealants having significant tack in the uncured state, good cured adhesion to surface treated (for example E-coated) metals, low controlled flow during curing, and desirable physical properties of the cured resin (at least semi-structural adhesive and cohesive strength). The increased tack of the sealant in the uncured state keeps the sealant in place on a substrate during a sealing process.

Further, the present invention provides sealing tapes characterized by good tack, low controlled flow during curing, improved drapability, paintability, resistance to blow-through, semi-structural bond strength, and which are processed without the use of solvents. The sealant compositions of the invention adhere to vertical substrates without flow prior to curing and with controlled flow during curing. The sealants of the invention provide particular utility in sealing metallic joints in automobile bodies or appliances during their manufacture.

A "tape" is defined as an adhesive film having a release liner or backing attached that can be formed into a roll or cut into pieces and wherein article's length is greater than its width.

An "unsupported film" is defined as a film having adhesive characteristics without a backing or a release liner.

A "curable" or "uncured" composition is a composition that remains thermoplastic and melt processable and substantially un-crosslinked until subjected to either heat, light, or a combination of both at which time the composition polymerizes and crosslinks to form a thermoset material.

A "protected film" is an uncured adhesive film having a release liner or backing attached that can be formed into a roll or cut into pieces and having a length that is substantially the same as its width.

DETAILED DESCRIPTION

The sealant compositions of the invention comprise from about 10 to about 70 weight percent, preferably about 20 to about 60 weight percent, more preferably about 30 to about 50 weight percent, of an epoxy containing material; from about 10 to about 85, preferably, from about 30 to about 60, more preferably about 35 to about 55 weight percent, thermoplastic ethylene-vinyl acetate copolymer; from about 5 to about 60 parts by weight, preferably about 10 to about 30 weight percent, more preferably about 15 to about 25 weight percent, thermoplastic polyester compatibilizing resin, the weight percents being based on the total resin content of the composition and equaling 100 weight percent; and an effective amount of a curative for the curable epoxy containing material.

Epoxy Resins

Epoxy resins useful in the compositions of the invention are any organic compounds having at least one oxirane ring, that is,

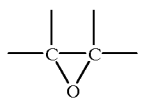

polymerizable by a ring opening reaction. Such materials, broadly called epoxides, include both monomeric and polymeric epoxides and can be aliphatic, alicyclic, heterocyclic, cycloaliphatic, or aromatic or can comprise combinations thereof. The epoxides can be liquid or solid or blends thereof, blends being useful in providing tacky adhesive films and are also called "polyepoxides". These materials generally have, on the average, at least two epoxy groups per molecule. The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more. Mixtures of various epoxy resins can also be used in the hot melt compositions of the invention. The "average" number of epoxy groups per molecule is defined as the number of epoxy groups in the epoxy resin divided by the total number of epoxy molecules present.

Useful epoxy resins include those which contain cyclohexene oxide groups such as the epoxy cyclohexanecarboxylates, typified by 3,4-epoxycyclohexylmethyl-3,4-epoxy cyclohexanecarboxylate, 3,4-epoxy-2-methylcyclohexylmethyl-3,4-epoxy-2-methycyclohexane carboxylate, and bis(3,4-epoxy-6-methylcyclohexylmethyl) adipate. For a more detailed list of useful epoxides of this nature, reference may be made to U.S. Pat. No. 3,117,099, incorporated herein by reference.

Further epoxy resins which are particularly useful in the practice of this invention include glycidyl ether monomers of the formula:

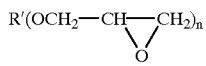

where R' is aliphatic, for example, alkyl, or aromatic, for example, aryl, or a combination thereof, and n is an integer of 1 to 6. Examples are the glycidyl ethers of polyhydric phenols obtained by reacting a polyhydric phenol with an excess of chlorohydrin such as epichlorohydrin, for example, the diglycidyl ether of 2,2-bis-(4-hydroxypnenol) propane (Bisphenol A). Further examples of epoxides of this type which can be used in the practice of this invention are described in U.S. Pat. No. 3,018,262, incorporated herein by reference. Preferred epoxy resins include diglycidyl ethers of Bisphenol A and aliphatic epoxy resins.

There are many commercially available epoxy resins which can be used in this invention. In particular, epoxides which are readily available include octadecylene oxide, epichlorohydrin, styrene oxide, vinylcyclohexene oxide, glycidol, glycidyl-methacrylate, diglycidyl ether of Bisphenol A (for example, those available under the trade designations "EPON 828", "EPON 1004", and "EPON 1001F" from Shell Chemical Co., and "DER-332" and "DER-334", from Dow Chemical Co.), diglycidyl ether of Bisphenol F (for example, "ARALDITE GY281" from Ciba-Geigy Corp and "EPON 862", from Shell Chemical Co.), vinylcyclohexene dioxide (for example, having the trade designation "ERL 4206" from Union Carbide Corp.), 3,4-epoxycyclohexyl-methyl-3,4-epoxycyclohexene carboxylate (for example, having the trade designation "ERL-4221" from Union Carbide Corp.), 2-(3,4-epoxycyclohexyl-5,5-spiro-3,4-epoxy) cyclohexane-metadioxane (for example, having the trade designation "ERL-4234" from Union Carbide Corp.), bis(3,4-epoxy-cyclohexyl) adipate (for example, having the trade designation "ERL-4299" from Union Carbide Corp.), dipentene dioxide (for example, having the trade designation "ERL-4269" from Union Carbide Corp.), epoxidized polybutadiene (for example, having the trade designation "OXIRON 2001" from FMC Corp.), epoxy silanes, for example, beta-3,4-epoxycyclohexylethyltri-methoxy silane and gamma-glycidoxypropyltrimethoxy silane, commercially available from Union Carbide, flame retardant epoxy resins (for example, having the trade designation "DER-542", a brominated bisphenol type epoxy resin, available from Dow Chemical Co.), 1,4-butanediol diglycidyl ether (for example, having the trade designation "ARALDITE RD-2" from Ciba-Geigy), hydrogenated bisphenol A-epichlorohydrin based epoxy resins (for example having the trade designation "EPONEX 1510" from Shell Chemical Co.), and polyglycidyl ether of phenol-formaldehyde novolak (for example, having the trade designation "DEN-431" and "DEN-438" from Dow Chemical Co.).

Curative

Curatives of the present invention can be photocatalysts or thermal curing agents. Curatives of the present invention preferably can be activated by photochemical means, such as by actinic radiation (radiation having a wavelength in the ultraviolet or visible portion of the electromagnetic spectrum). Useful photocatalysts are of two general types: onium salts and cationic organometallic salts, both described in U.S. Pat. No. 5,709,948, incorporated herein by reference.

Onium salt photoinitiators for cationic polymerizations include iodonium and sulfonium complex salts. Useful aromatic iodonium complex salts are of the general formula:

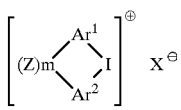

wherein

Ar$^1$ and Ar$^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, and a carbon-carbon bond,

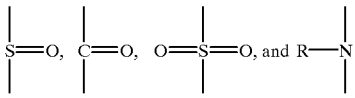

wherein R can be aryl (having from 6 to about 20 carbon atoms, such as phenyl) or acyl (having from 2 to about 20 carbon atoms, such as acetyl, or benzoyl), and

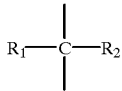

wherein R$_1$ and R$_2$ are selected from the group consisting of hydrogen, alkyl radicals having from 1 to about 4 carbon atoms, and alkenyl radicals having from 2 to about 4 carbon atoms;

m is zero or 1; and

X has the formula DQ$_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are BF$_4^-$, PF$_6^-$, SbF$_6^-$, FeCl$_4$, SnCl$_5^-$, AsF$_6^-$, SbF$_5$OH$^-$, SbCl$_6^-$, SbF$_5^{-2}$, AlF$_5^{-2}$, GaCl$_4^-$, InF$_4^-$, TiF$_6^{-2}$, ZrF$_6^-$, CF$_3$SO$_3$, and the like. Preferably, the anions are BF$_4^-$, PF$_6^-$, SbF$_6^-$, AsF$_6^-$, SbF$_5$OH$^-$, and SbCl$_6^-$. More preferably, the anions are SbF$_6^-$, AsF$_6^-$, and SbF$_5$OH$^-$.

The Ar$_1$ and Ar$_2$ aromatic groups may optionally comprise one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference. The preferred aromatic iodonium complex salts are (Ar)$_2$I PF$_6$ and (Ar)$_2$I SbF$_6$.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt initiators suitable for use in the invention are of the general formula:

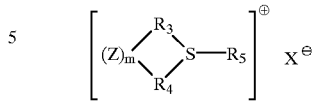

wherein

R$_3$, R$_4$, and R$_5$ can be the same or different, provided that at least one of the groups is aromatic. These groups can be selected from the group consisting of aromatic moieties having from 4 to about 20 carbon atoms (for example, substituted and unsubstituted phenyl, thienyl, and furanyl) and alkyl radicals having from 1 to about 20 carbon atoms. The term "alkyl" includes substituted alkyl radicals (for example, substituents such as halogen, hydroxy, alkoxy, and aryl). Preferably, R$_3$, R$_4$, and R$_5$ are each aromatic; and Z, m, and X are all as defined above with regard to the iodonium complex salts.

If R$_3$, R$_4$, or R$_5$ is an aromatic group, it may optionally have one or more fused benzo rings (for example, naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl) diphenylsulfonium hexafluoroantimonate are the preferred sulfonium salts. Useful sulfonium salts are described more fully in U.S. Pat. No. 5,256,828.

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

Suitable photoactivatable organometallic complex salts useful in the invention include those described in U.S. Pat. Nos. 5,059,701; 5,191,101; and 5,252,694, each of which is incorporated herein by reference. Such salts of organometallic cations have the general formula:

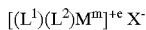

$$[(L^1)(L^2)M^m]^{+e}\, X^-$$

wherein

M$^m$ represents a metal atom selected from elements of periodic groups IVB, VB, VIB, VIIB, and VIII, preferably Cr, Mo, W, Mn, Re, Fe, and Co;

L$^1$ represents none, one, or two ligands contributing π-electrons that can be the same or different ligand selected from the group consisting of substituted and unsubstituted alicyclic and cyclic unsaturated compounds and groups and substituted and unsubstituted carbocyclic aromatic and heterocyclic aromatic compounds, each capable of contributing two to twelve π-electrons to the valence shell of the metal atom M. Preferably, L$^1$ is selected from the group consisting of substituted and unsubstituted η$^3$-allyl, η$^5$-cyclopentadienyl, η$^7$-cycloheptatrienyl compounds, and η$^6$-aromatic compounds selected from the group consisting of η$^6$-benzene and substituted η$^6$-benzene compounds (for example, xylenes) and compounds having 2 to 4 fused rings, each capable of contributing 3 to 8 π-electrons to the valence shell of M$^m$;

L$^2$ represents none or 1 to 3 ligands contributing an even number of σ-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M'''$ by $L^1$ and $L^2$ results in a net residual positive charge of e to the complex;

e is an integer having a value of 1 or 2, the residual charge of the complex cation; and X is a halogen-containing complex anion, as described above.

Examples of suitable salts of organometallic complex cations useful as photoactivatable catalysts in the present invention include:

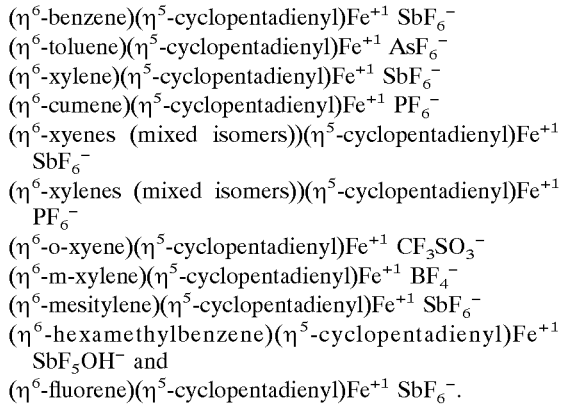

$(\eta^6\text{-benzene})(\eta^5\text{-cyclopentadienyl})Fe^{+1}\ SbF_6^-$
$(\eta^6\text{-toluene})(\eta^5\text{-cyclopentadienyl})Fe^{+1}\ AsF_6^-$
$(\eta^6\text{-xylene})(\eta^5\text{-cyclopentadienyl})Fe^{+1}\ SbF_6^-$
$(\eta^6\text{-cumene})(\eta^5\text{-cyclopentadienyl})Fe^{+1}\ PF_6^-$
$(\eta^6\text{-xyenes (mixed isomers)})(\eta^5\text{-cyclopentadienyl})Fe^{+1}\ SbF_6^-$
$(\eta^6\text{-xylenes (mixed isomers)})(\eta^5\text{-cyclopentadienyl})Fe^{+1}\ PF_6^-$
$(\eta^6\text{-o-xyene})(\eta^5\text{-cyclopentadienyl})Fe^{+1}\ CF_3SO_3^-$
$(\eta^6\text{-m-xylene})(\eta^5\text{-cyclopentadienyl})Fe^{+1}\ BF_4^-$
$(\eta^6\text{-mesitylene})(\eta^5\text{-cyclopentadienyl})Fe^{+1}\ SbF_6^-$
$(\eta^6\text{-hexamethylbenzene})(\eta^5\text{-cyclopentadienyl})Fe^{+1}\ SbF_5OH^-$ and
$(\eta^6\text{-fluorene})(\eta^5\text{-cyclopentadienyl})Fe^{+1}\ SbF_6^-$.

Preferred salts of organometallic complex cations useful in the invention include one or more of the following: $(\eta^6\text{-xylenes (mixed isomers)})(\eta^5\text{-cyclopentadienyl})Fe^{+1}\ SbF_6^-$, $(\eta^6\text{-xylenes (mixed isomers)})(\eta^5\text{-cyclopentadienyl})Fe^{+1}\ PF_6^-$, $(\eta^6\text{-xylene})(\eta^5\text{-cyclopentadienyl})Fe^{+1}\ SbF_6^-$, and $(\eta^6\text{-mesitylene})(\eta^{-5}\text{-cyclopentadienyl})Fe^{+1}\ SbF_6^-$.

Useful commercially available initiators include FX-512™ (Minnesota Mining and Manufacturing Company, St. Paul, Minn.), CD-1010™ and CD1012™ (Sartomer,Exton, Pa.) aromatic sulfonium complex salts, UVI™-6974, an aromatic sulfonium complex salt (Union Carbide Corp., Danbury, Conn.) and IRGACURE™ 261, a cationic organometallic complex salt (Ciba Geigy Chemicals, Hawthorne, N.Y.).

Preferably, the photocurative of the invention, if employed, comprises from about 0.01 to 10 weight percent, more preferably from 0.1 to 5 weight percent, still more preferably from 0.5 to 2 weight percent of a photocatalyst, the weight percent being based on the combined weight of the epoxy resin, ethylene-vinyl acetate component, and the polyester component.

Where the catalytic photoinitiator used for curing the epoxy resin is a metallocene salt catalyst, it optionally is accompanied by an accelerator such as an oxalate ester of a tertiary alcohol as described in U.S. Pat. No. 5,436,063. Oxalate co-catalysts that can be used include those described in U.S. Pat. No. 5,252,694. The accelerator preferably comprises from about 0.01 to about 5 weight percent, more preferably, about 0.1 to 4 weight percent of the composition based on the combined weight of the epoxy resin, ethylene-vinyl acetate component, and the polyester component.

Certain thermally-activated curing agents for epoxy resins (for example, compounds that effect curing and crosslinking of the epoxide by entering into a chemical reaction therewith) are useful in the present invention. Preferably, such curing agents are thermally stable at temperatures at which mixing of the components takes place.

Suitable thermal curing agents include aliphatic and aromatic primary and secondary amines, for example, di(4-aminophenyl)sulfone, di(4-aminophenyl)ether, and 2,2-bis-(4-aminophenyl)propane; aliphatic and aromatic tertiary amines, for example, dimethylaminopropylamine and pyridine; fluorene diamines, such as those described in U.S. Pat. No. 4,684,678, incorporated herein by reference; boron trifluoride complexes such as $BF_3Et_2O$ and $BF_3H_2NC_2H_4OH$; imidazoles, such as methylimidazole and the like; hydrazines, such as adipohydrazine; anhydrides, such as phthalic anhydride, succinic anhydride, and the like; acid curatives, such as acrylic acid, methacrylic acid, and the like, and guanidines, such as tetramethylguanidine and dicyandiamide (cyanoguanidine, also commonly known as DiCy), and mixtures thereof.

Useful commercially available thermal curing agents include modified alipahtic amines such as ANCAMINE™ 2014AS, 2014FG, 2337S, and 2441 (Air Products and Chemicals, Allentown, Pa.), ANCAMINE™ 1770, 2049 cycloaliphatic amines (Air Products and Chemicals, Allentown, Pa.) ANCHOR™ 1040, 1115, AND 1222 boron trifluoride amine complexes (Air Products and Chemicals, Allentown, Pa.), AMICURE™ CG-1200,CG-1400, CG-325, CG-NA dicyandiamide (Air Products and Chemicals, Allentown, Pa.), CUREZOL™ 2MZ-AZINE, 2,4-diamino-6(2'methylimidazoleyl-(1'))ethyl-s-triazine and other imidizoles such as CUREZOL™ AMI-2, 2E4MZ, 1B2MZ, 2PZ, C17Z, 2PHZ-S, 2MA-OK curatives (Air Products and Chemicals), and AMICURE™ UR and UR2T, substituted ureas (Air Products and Chemicals),.

Preferably, the thermal curative of the invention comprises from about 1 to 25 weight percent, more preferably from about 2 to about 20 weight percent, and still more preferably from about 3 to about 15 weight percent of one or more thermal catalysts, the weight percent being based on the combined weight of the epoxy resin, ethylene-vinyl acetate component, and the polyester component.

In the case of photocatalysts, increasing amounts of the catalyst results in an accelerated curing rate but requires that the hot melt sealant composition be applied in a thinner layer so as to avoid curing only at the surface. Increased amounts of catalyst can also result in reduced energy exposure requirements and a shortened pot life at application temperatures. The amount of the catalyst is determined by the rate at which the sealant composition should cure, the intensity of the energy source, and the thickness of the sealant composition.

Ethylene-Vinyl Acetate Copolymer

Useful ethylene-vinyl acetate copolymers contain from about 9 to about 89 percent, preferably from about 28 to about 80 percent, and more preferably from about 40 to about 80 percent, even more preferably from about 40 to about 70 percent vinyl acetate by weight of the copolymer.

Non-limiting examples of commercially available ethylene-vinyl acetate copolymers that may used in practice of the present invention include ELVAX™ 750 (9 weight percent vinyl acetate), ELVAX™ 660 and 670 (each having 12 weight percent vinyl acetate); ELVAX™ 550 and 560 (E. I. Du Pont de Nemours and Co., Wilmington, Del.), and ULTRATHENE™ UE 685-009 (Millenium Petrochemicals, Inc., Cincinnati, Ohio) (each having 15 weight percent vinyl acetate); ELVAX™ 450 and ULTRATHENE™ UE 649-22 (each having 18 weight percent vinyl acetate); ELVAX™ 210, 250, and 260 and AT Plastics 2820M EVA copolymer (AT Plastics, Inc., Brampton, Ontario, Canada) (28 weight percent vinyl acetate); ELVAX™ 150 and AT Plastics 3325M EVA copolymer (33 weight percent vinyl acetate); ELVAX™ 40W and LEVAPREN™ 400 (Bayer Corp., Pittsburgh, Pa.), AT Plastics 4030M EVA copolymer (40 weight percent vinyl acetate); LEVAPREN™ 450, 452, and 456 (45 weight percent vinyl acetate); LEVAPREN™ 500HV (50 weight percent vinyl acetate); LEVAPREN™ 600 HV (60 weight percent vinyl acetate); and LEVAPREN™ 700 HV (70 weight percent vinyl acetate), and the like. Blends of any of the forgoing ethylene-vinyl acetate copolymers may be used in compositions of the invention.

Thermoplastic Polyester

Thermoplastic polyesters are preferred as the polyester component of the compositions of the invention. Useful polyester components include both hydroxyl and carboxyl terminated materials, which may be amorphous or semicrystalline, of which the hydroxyl terminated materials are more preferred. By "amorphous" is meant a material that displays a glass transition temperature but does not display a measurable crystalline melting point by differential scanning calorimetry (DSC). Preferably the glass transition temperature is less than the decomposition temperature of the initiator (discussed below), but without being more than about 120° C. By "semicrystalline" is meant a polyester component that displays a crystalline melting point by DSC, preferably with a maximum melting point of about 150° C.

Polyester components useful in the compositions of the invention preferably have a Brookfield viscosity which exceeds 10,000 millipascals at 121° C. as measured on a Brookfield Viscometer Model #DV-II employing spindle #27 with a thermocel attachment. Viscosity is related to the molecular weight of the polyester component. Preferred polyester components also have a number average molecular weight of about 7,500 to 200,000, more preferably from about 10,000 to 50,000, and most preferably from about 20,000 to 40,000.

Polyester components useful in the sealant compositions of the invention comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms. Examples of suitable aliphatic acids are succinic, glutaric, adipic, pimelic, suberic, azelaic, sebacic, 1,12 dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid, and 4,4'-diphenylamine dicarboxylic acid. Preferably the structure between the two carboxyl groups in these diacids contains only carbon and hydrogen; more preferably, it is a phenylene group. Blends of any of the foregoing diacids may be used.

The diols include branched, unbranched, and cyclic aliphatic diols having from 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'-ethanol), cyclohexane-1,4-dimethanol, 1,10-decanediol, 1,12-dodecanediol, and neopentyl glycol. Long chain diols including poly (oxyalkylene) glycols in which the alkylene group contains from 2 to 9 carbon atoms (preferably 2 to 4 carbon atoms) may also be used. Blends of any of the foregoing diols may be used.

Useful, commercially available hydroxyl terminated polyester materials include various saturated, linear, semicrystalline copolyesters, available from Creanova, Inc., under the trade designations including "DYNAPOL S1402", "DYNAPOL S1358", "DYNAPOL S1227", "DYNAPOL S1229", and "DYNAPOL S1401". Useful saturated, linear amorphous copolyesters, available from Creanova, Inc. include materials under the trade designations "DYNAPOL S1313" and "DYNAPOL S1430".

Preferably, the components (exclusive of additives described below) used to form the compositions of the invention are compatible in the molten state. "Compatible" means that the molten mixture of components is single phased, that is, does not visibly phase separate among the individual components and forms a homogeneous mixture of molten components.

Of course, one skilled in the art can easily vary the concentrations of the epoxy resins, EVA copolymers and vinyl acetate content therein, polyester resins, and catalysts to form compositions of the invention without undue experimentation. For example, increasing the relative amount of polyester in the composition enhances compatibility of the epoxy and ethylene-vinyl acetate copolymer components.

The specific physical properties of the adhesives of the invention may be tailored to suit the specific application by adjusting the ratio of the preceding components. Generally, a decreased tendency to flow during cure is achieved by increasing the relative amount of ethylene-vinyl acetate copolymer in the formulation. Generally, adhesion and tack is increased in the adhesive by increasing the amount of vinyl acetate in the EVA copolymer. However, increasing the relative amount of polyester in the composition generally reduces tack, and increases flow of the adhesive. The amount of curative is selected to optimize cure speed, uncured product life, and uniformity of through cure. Thus, the relative amounts of the above mentioned ingredients are balanced depending on the properties sought in the final composition.

Hydroxyl Containing Material

Optionally, the sealant compositions of the invention may further comprise a hydroxyl-containing material. The hydroxyl-containing material may be any liquid or solid organic material having hydroxyl functionality of at least 1, preferably at least 2. The hydroxyl-containing organic material should be free of other "active hydrogen" containing groups such as amino and mercapto moieties. The hydroxyl-containing organic material should also preferably be devoid of groups which may be thermally or photochemically unstable so that the material will not decompose or liberate volatile components at temperatures below about 100° C. or when exposed to the energy source during curing. Preferably the organic material contains two or more primary or secondary aliphatic hydroxyl groups (that is, the hydroxyl group is bonded directly to a non-aromatic carbon atom). The hydroxyl group may be terminally situated, or may be pendant from a polymer or copolymer. The number average equivalent weight of the hydroxyl-containing material is preferably about 31 to 2250, more preferably about 80 to 1000, and most preferably about 80 to 350. More preferably, polyoxyalkylene glycols and triols are used as the hydroxyl-containing material. Even more preferably, cyclohexane dimethanol is used as the hydroxyl-containing material.

Representative examples of suitable organic materials having a hydroxyl functionality of 1 include alkanols, monoalkyl ethers of polyoxyalkylene glycols, and monoalkyl ethers of alkylene glycols.

Representative examples of useful monomeric polyhydroxy organic materials include alkylene glycols (for example, 1,2-ethanediol, 1,3-propanediol, 1,4-butanediol, 2-ethyl-1,6-hexanediol, 1,4-cyclohexane dimethanol, 1,18-dihydroxyoctadecane, and 3-chloro-1,2-propanediol), polyhydroxyalkanes (for example, glycerine, trimethylolethane, pentaerythritol, and sorbitol), and other polyhydroxy compounds such as N,N-bis(hydroxyethyl)benzamide, butane-1,4-diol, castor oil, and the like.

Representative examples of useful polymeric hydroxyl-containing materials include polyoxyalkylene polyols (for example, polyoxyethylene and polyoxypropylene glycols and triols of equivalent weight of 31 to 2250 for the diols or 80 to 350 for triols), polytetra-methylene oxide glycols of varying molecular weight, hydroxyl-terminated polyesters, and hydroxyl-terminated polylactones.

Useful commercially available hydroxyl-containing materials include those described in U.S. Pat. No. 5,436,063, incorporated herein by reference.

The amount of hydroxyl-containing organic material used in the compositions of the invention may vary over a broad range, depending on factors such as the compatibility of the hydroxyl-containing material with both the epoxy resin and the polyester component, the equivalent weight and functionality of the hydroxyl-containing material, and the physical properties desired in the final cured sealant composition. Typically, the amount of hydroxyl containing material in compositions of the invention range from 0 to about 25 percent by weight of the epoxy containing material in the composition.

The optional hydroxyl-containing material is particularly useful in tailoring the glass transition temperature and flexibility of the cured compositions of the invention. As the equivalent weight of the hydroxyl-containing material increases, the flexibility of the sealant composition correspondingly increases although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties.

As explained more fully hereinbelow, the incorporation of hydroxyl containing materials, specifically polyether polyols, into the compositions of the invention is especially desirable for adjusting the rate at which the sealant compositions cure upon exposure to energy. Useful polyether polyols (that is, polyoxyalkylene polyols) for adjusting the rate of cure include polyoxyethylene and polyoxypropylene glycols and triols having an equivalent weight of about 31 to 2250 for the diols and about 80 to 350 for the triols, as well as polytetramethylene oxide glycols of varying molecular weight and polyoxyalkylated bisphenol A's.

The relative amount of the optional hydroxyl-containing organic material is determined with reference to the ratio of the number of hydroxyl groups to the number of epoxy groups in the composition. That ratio may range from 0:1 to 1:1, more preferably from about 0.4:1 to 0.8:1. Larger amounts of the hydroxyl-containing material increase the flexibility of the composition but with a consequent loss of cohesive strength. If the hydroxyl containing material is a polyether polyol, increasing amounts will further slow the curing process.

Additives

Optionally, the compositions of the invention may further comprise up to about 50 percent, preferably up to 30 percent by volume of the total composition of various additives. Useful additives include fillers, stabilizers, plasticizers, tackifiers, flow control agents, cure rate retarders, adhesion promoters (for example, silanes and titanates), and other known adjuvants. Specific examples of useful additives include silica, glass, clay, talc, pigments, colorants, glass beads or bubbles, glass or ceramic fibers, and antioxidants. Additives are generally used in the compositions of the invention to reduce the weight or cost of the composition, adjust viscosity, and provide additional reinforcement or modify the thermal conductivity of the compositions and articles of the invention so to achieve a more rapid or uniform cure. The various additives are not included in the foregoing weight percent calculations for the adhesive composition.

Method of Making

The sealant compositions of the invention can be prepared by using either a batch or a continuous process as long as the components are compatible in the melt phase. That is, no visible gross phase separation among the components.

In a batch process, the sealant compositions of the invention are prepared by mixing the various ingredients in a suitable vessel, preferably one that is not transparent to actinic radiation, at an elevated temperature sufficient to liquify the components so that they can be efficiently mixed with stirring until the components are thoroughly melt blended but without thermally degrading or causing premature curing of the materials. The components may be added simultaneously or sequentially, although it is preferred to first blend (in order) the ethylene-vinyl acetate copolymer, thermoplastic polyester, and epoxy-containing material followed by the addition of the curative for the epoxy containing material.

In a continuous process, the adhesive compositions of the invention are mixed in an extruder as above, for example a twin screw extruder, equipped with a down stream port, a static mixer, and an appropriate output orifice (film die, sheet die, profile die, etc.) and a take-up roll and wind up roll(s), as appropriate. Take-up line speed is adjusted as appropriate for the output form.

The compositions may be used directly after melt blending (in a molten mixture) or may be packaged as a solvent free system in pails, drums, cartridges or other suitable containers, in the absence of light if required, until ready for use. The compositions so packaged may be delivered to a hot-melt applicator system with the use of pail unloaders, cartridge dispensers, and the like. Alternatively, the adhesive compositions of the invention may be delivered to conventional bulk hot melt applicator and dispenser systems in the form of sticks, pellets, slugs, blocks, pillows, or billets.

It is also possible to provide the sealant compositions of the invention as uncured, unsupported adhesive film. Such films are useful in laminating operations. If the adhesive film is tacky, it may be provided as a tape wherein the composition is provided in film form and rolled up into a roll with a release liner (for example, silicone-coated Kraft paper), with subsequent packaging in a bag or other container that is not transparent to actinic radiation.

The compositions of the invention may be applied to a wide variety of substrates as protective or decorative coatings by extruding, spraying, gravure printing, or coating, (for example, by using a coating die, a heated knife blade coater, a roll coater, or a reverse roll coater). Alternatively, the composition may be applied as an uncured adhesive film which, if necessary, can be die cut to a predefined shape.

Substrates which can be coated or bonded include plastics, metals, ceramics, glass and cellulosic materials although primed, bare or painted metal substrates such as aluminum, cold rolled steel and porcelainized steel are particularly preferred.

Typically, the composition of the invention is applied to a single substrate by any of the methods described above, and once so applied is heated or exposed to actinic radiation source to initiate the curing of the epoxy-containing material.

Curing of sealant compositions containing a thermal curing agent begins upon exposure of the composition to thermal energy, that is, heat. The amount of heat required to completely cure the composition depends upon the thermal curative used, the amount of curative, and the thickness of the composition among others. Exposure times may be from 0.01 to 30 minutes or even longer, preferably from about 1 to about 10 minutes at temperatures ranging from about 50° C. to about 350° C., although differing temperatures may be used depending on the specific curative used. An oven is preferably used to cure compositions of the invention.

Curing of sealant compositions comprising a photocatalyst begins upon exposure of the composition to any source emitting actinic radiation (that is, radiation having a wavelength in the ultraviolet or visible spectral regions) and continues for a period of time thereafter. Suitable sources of radiation include mercury, xenon, carbon arc, tungsten filament lamps, sunlight, etc. Ultraviolet radiation, especially from a medium pressure mercury arc lamp, is most preferred. Exposure times may be from less than about 1 second to 10 minutes or more (to provide a total energy exposure of about 0.2 Joules/square centimeter ($J/cm^2$)) depending upon both the amount and the type of reactants involved, the radiation source, the distance from the radiation source, and the thickness of the composition to be cured.

The compositions may also be cured by exposure to electron beam radiation. The dosage necessary is generally from less than 1 megarad to 100 megarads or more. The rate of curing tends to increase with increasing amounts of photoinitiator at a given light exposure or irradiation. The rate of curing also increases with increased radiation intensity or electron dosage.

Articles

Adhesive sealant articles according to the invention may be readily prepared in many ways. For example, the ingredients for the adhesive composition may be melt blended as described above and then formed into its final shape by a variety of different methods. For example, the adhesive composition can be coated onto a release liner using a heated knife coater.

Alternatively, the adhesive composition ingredients may be compounded in an extruder and then extruded through a die having a desired profile to produce a shaped strip of adhesive; that is, a strip having the desired cross-sectional shape.

In one method of manufacture, a release liner is laminated to a film of the uncured sealant composition to form a protected film and then converted into the desired final form by, for example, slitting it to the desired width and winding it up into roll form and around a suitable plastic or paper core if needed. Alternatively, the tape or protected film can be slit or otherwise cut into discrete lengths or die cut into desired shapes.

After application to a substrate, a thermoplastic paint receptive film that is dimensionally stable at temperatures of use, that is, oven paint cycles up to about 200° C. and cold weather temperatures down to about −40° C., can be laminated to the exposed surface of the sealant film before curing to provide a smooth surface for painting after curing. Useful paint receptive films, also called "barrier films", include polyimide films and biaxially oriented polyester films having thicknesses ranging from about 0.025 mm to about 0.5 mm, and preferably having thicknesses in the range from 0.05 mm to about 0.25 mm. The paint receptive film can be treated to enhance adhesion to the sealant films, for example, primed or corona treated.

It is also necessary to protect the composition from premature activation, for example, during storage and shipping. When in the form of sheets or tapes, this may be accomplished, for example, by covering the adhesive composition with a radiation-blocking release liner. Alternatively, the entire tape-bearing construction can be stored in a radiation-blocking container.

The above-described tapes in the cured form can be used for example to establish a seal between a variety of substrates, to adhere two substrates together, and as a backing for a tape, for example, an acrylate adhesive. The invention will now be described further by way of the following non-limiting examples.

EXAMPLES

Unless otherwise specified, the materials used in these examples may be obtained from standard commercial sources such as Aldrich Chemical Co. of Milwaukee, Wis. All amounts used in the examples are in parts by weight unless otherwise specified.

$Ar_3S^+SbF_6^-$ (photocatalyst) was prepared as described in U.S. Pat. No. 4,173,476 (col. 5, line 43 to col. 6 line 32), incorporated herein by reference.

The BRABENDER mixer was obtained from C. W. Brabender Instruments, Inc., South Hackensack, N.J.

$Cp(Xyl)Fe^+SbF_6^-$, (photocatalyst) also described as: ($eta^6$-xylenes)($eta^5$-cyclopentadienyl)iron (1+) hexafluoroantimonate (mixed xylenes; Cp=cyclopentadiene), was prepared as disclosed in U.S. Pat. No. 5,089,536.

Super diazo TLD 15W/03 bulbs are available from Philips N.V., The Netherlands.

E-coated steel panels (ED 5100) were obtained from Advanced Coating Technologies, Inc. of Hillsdale, Mich..

ELVAX™ 500W ethylene-vinyl acetate copolymer (2500 melt index, 14 percent vinyl acetate) and ELVAX™ 40W ethylene-vinyl acetate copolymer (56 melt index, 40 percent vinyl acetate) were obtained from E.I. Du Pont de Nemours & Co. of Wilmington, Del.

Epoxy Resin A is a Bisphenol A endcapped aliphatic epoxy resin (solid at RT) having an epoxy equivalent weight of 850±50, as described in Example 1 of U.S. Pat. No. 5,407,978 (Bymark et al.).

Dicyandiamide (AMERICURE™ CG-1200) and CUREZOL™ 2MZ-Azine 2,4-diamino-6(2'methylimidazoleyl-(1'))ethyl-s-triazine (thermal curing agents) were obtained from Air Products and Chemicals, Inc. of Allentown, Pa.

DYNAPOL™ S1402 (high molecular weight thermoplastic polyester with low crystallinity) was obtained from Creanova, Inc. of Somerset, N.J. Polyester Resin A is a hydroxyl functional, semi-crystalline copolymer of 50 weight percent butanediol, 23 weight percent terephthalic acid, and 27 weight percent sebacic acid, with a melting point of 116° C., a glass transition temperature of −40° C., and a melt flow rate at 160° C. of 250 g/10 minutes.

EPON™ 1001F epoxy resin, EPON™ 828 epoxy resin of bisphenol A and HELOXY™ 84 epoxy modifier, were obtained from Shell Chemical Co. of Houston, Tex.

The Fusion Systems LC-6 Benchtop Conveyor and F300 Lamp System were obtained from Fusion Systems Corp. of Rockville, Md.

UNILIN™ 425 wax was obtained from Petrolite Corp. of St. Louis, Mo.

FPL etched metal coupons were freshly prepared in a similar manner to the etching process described in H. W.

Eichner, Forest Products Laboratory; Report No. 1842, Apr. 1, 1954, Madison, Wis.

Specifically, the specimens were treated as follows: Each specimen was degreased by soaking for 10 minutes in 75 g of OAKITE™ 164 (alkaline detergent, Oakite Products Inc. of Berkely Heights, N.J.) per liter of distilled water. Each specimen was then rinsed for 2 minutes in tap water, followed by immersion for 10 minutes at 66–71° C. in an etching bath consisting of 1161 g of $H_2SO_4$, 156.8 g of $Na_2Cr_2O_7$ 2 $H_2O$, 1.5 g of 2024-T3 bare aluminum alloy chips, and enough distilled water to make 3.5 liters of solution. Following immersion in the etching solution, each specimen is rinsed for 2 minutes with tap water, air dried for 10 minutes, and dried for 10 minutes at 71° C. This procedure was used for all of the following examples, unless otherwise specified.

General Procedure A For The Preparation Of Sealant Compositions

All ingredients other than curatives were placed in a container and heated in a convection oven to a temperature sufficient to allow mixing by hand. Typically this was at 149° C. for about 60 minutes. After removal from the oven, the samples were mixed by hand using a tongue depressor. The material was allowed to cool for at least 1 hour before proceeding to the next step.

The cooled material was reheated in a convection oven at 121° C. for 90 minutes. The sample was then removed from the oven and the curatives to be used were added and mixed into the material by hand. After mixing, the material was returned to the oven for 8 minutes.

The material was then removed from the oven and coated onto silicone coated release liner or the desired substrate to the desired thickness using a knife coater with an appropriate coating gap setting.

General Procedure B For The Preparation Of Sealant Compositions

Adhesive compositions were prepared in batch mode using a heated, internally-stirred BRABENDER mixer equipped with roller blades operated at approximately 50 rpm. EVA and/or polyester were added to the mixer with stirring and heating to 90° C. until homogeneous. The temperature of the mixture was observed to increase to approximately 95° C. due to stirring friction. The epoxy resin was then added slowly and stirring was continued for 1 minute. Then remaining ingredients were added such that any curatives were added last and stirring was continued until dispersed (ambient light was minimized when photo-curatives were added). The mixture was removed from the reactor and pressed twice at between 121–177° C. in a heated laboratory press, between silicone coated release liners to obtain a free-standing film of desired thickness.

Curing of the Adhesive Compositions of the invention was accomplished as follows depending on the curative used:

Photo-cured compositions were exposed to irradiation using superactinic lamps (TLD 15W/03 lamps) at approx. 2.2 $J/cm^2$ for, for example 2–10 minutes depending on the thickness of the film, typically 10 minutes per side for 40 mil thickness film (at a distance of about 10 cm). Over exposure to the lights was not detrimental to the performance of the adhesive. This exposure was followed by a thermal post-curing step at 177° C. for 20 minutes to effect cure unless otherwise noted.

Thermally cured compositions were heated to 177° C. for 30 minutes to effect cure unless otherwise noted.

Test Methods

45° Flow Test

An E-coated panel was cleaned by spraying with 50 percent aqueous isopropanol and wiping dry, allowing sufficient time to ensure complete drying. The sample to be measured (typically 14.5 mm by 25.4 mm) was lightly adhered to an E-coated panel so that the narrow edge of the sample was pointing down the panel. The panel was then placed in an oven at a 45° incline for 20 minutes at 177° C. unless otherwise specified. The sample was then removed from the oven and allowed to cool to room temperature. Flow was measured as the distance (in mm) the sample flowed relative to its initial position.

Uncured E-Coat Adhesion Test

A 1.3 cm by 20.3 cm strip of film of the invention was cut. The cut film was applied to an E-coated panel (ED 5100) by hand and hand pressure was applied until the film made complete contact with the panel. The panel was rotated 90 degrees to vertical and the film was observed for delamination. In the Tables below, "yes" means the film adhered; "no" means that the film at least partially delaminated.

Cured E-Coat Adhesion Test

After a sample of the sealant composition was baked out on an E-coated panel (177° C. for 20 minutes), a finger, knife, or razor blade was used to remove the sealant layer adhered to the E-coated panel and observed whether adhesive or cohesive failure had occurred. In the Tables below, "good" means that the film could not be easily pried or scraped from the panel; "poor" means that the film could be easily pried or scraped from the panel.

Curl Test

A sample of the sealant was laminated with a 0.13 mm thick polyester film. A 14.5 mm by 7.6 cm strip was cut out by using a razor blade. The sample was applied to an E-coated panel (ED 5100). The panel was heated slightly (104° C. oven for 30 seconds) and the sample was tacked down by hand. The sample was then painted horizontally using the following procedure:

Approximately 0.15 mm (dry thickness) of primer (BASF Corp., Mount Olive, N.J.; U28RK035) was applied using a spray gun. The sample was flash dried for 10 minutes at ambient conditions, baked at 154° C. for 20 minutes in a forced air oven, and removed from the oven and allowed to cool. Approximately 0.025 mm (dry thickness) of basecoat (E. I. Du Pont de Nemours and Co., Wilmington, Del.; 692R45366) was sprayed onto the sample and flash dried at ambient conditions for 5 minutes. Approximately 0.05 mm (dry thickness) of Clearcoat (E. I. Du Pont de Nemours and Co., Wilmington, Del.; RKF45500; Gen III type) was sprayed onto the sample, flash dried for 10 minutes at ambient conditions, baked at 143° C. for 25 minutes, and removed from oven and allowed to cool. The sample was then rebaked at 143° C. for another 25 minutes, removed, and allowed to cool. Then the sample was rebaked ($3^{rd}$ time) at 143° C. for 25 minutes, removed, and allowed to cool.

Curling (PET film separating from the sealant due to shrinkage of paint system), if any, was recorded.

Mandrel Bend Test

A 1.3 cm by 12.7 cm strip of material was cut out using a razor blade. The sample along with the mandrel bend tester was cooled to the desired temperature for a minimum of 12 hours. The mandrel bend tester (Cylindrical) used was an Erichsen Model 266 (Erichsen GMBH & CO KG (D5870 Hemer, Germany). The sample and tester were kept in the cold room during testing. The samples were put in the tester and bent around a 25 mm cylinder for 180 degrees. The material passed if it did not crack during the procedure.

Thumb Tack Test

The sample was evaluated by touching the sample with a thumb and determining whether it was tacky or not to the touch.

Tensile and Elongation Test

Tensile measurements were made in the usual fashion with attention to the following parameters. Samples were cut to size using ASTM method D-412, Die C. The samples were then conditioned under constant temperature (23±2° C.) and humidity (50±10 percent relative humidity) for at least 24 hours after preparation and before testing. Tensile strength and elongation were measured using an INSTRON tensile tester using a jaw gap of 50.8 mm and a crosshead speed of 508 mm/minute. Peak tensile strength (in MPa) and optionally percent elongation at peak were recorded.

Overlap Shear Test

A sealant composition was laminated between FPL etched 2024 T3 aluminum coupons both 25.4 mm by 76.2 mm as follows: a 12.7 mm by 25.4 mm sample of sealant was attached flush to the narrow edge of both coupons so that the overall construction was about 63.5 mm in length. The laminate was clamped together with spring-steel binder clips (0.95 cm capacity clips, ACCO USA, Inc. of Wheeling, Ill.) heated in an oven at 177° C. for 20 minutes, unless otherwise specified. Overlap shear was measured using a SINTECH Model 10 tensile tester equipped with a 22.2 kNewton load cell at a crosshead speed of 2.54 mm/min. The maximum force before breakage of the sample and the failure mode (for example, cohesive, adhesive, mixed) were noted.

Examples 1–5

These examples demonstrate the effect of polyester content on the adhesive properties of thermally cured epoxy/EVA/polyester sealant compositions according to the present invention. The increased adhesion values of Examples 2–5 are due to the effectiveness of the polyester resin in forming a compatible mixture of epoxy and EVA resins.

TABLE 1

| Ingredients | Comparative Example 1 | Example 1 | Example 2 | Example 3 | Example 4 | Example 5 |
|---|---|---|---|---|---|---|
| ELVAX ™ 40 W | 50 | 45 | 40 | 35 | 30 | 25 |
| EPON ™ 828 | 50 | 50 | 50 | 50 | 50 | 50 |
| DYNAPOL ™ S1402 | 0 | 5 | 10 | 15 | 20 | 25 |
| Dicyandiamide | 3.5 | 3.5 | 3.5 | 3.5 | 3.5 | 3.5 |
| CURAZOL ™ 2-MZ | 1.5 | 1.5 | 1.5 | 1.5 | 1.5 | 1.5 |
| OVERLAP SHEAR ADHESION (MPa) | 7.92 | 6.80 | 11.09 | 18.52 | 20.80 | 20.22 |

Examples 6–9

Examples 6–9 illustrate the effect of the EVA copolymer concentration on the reduction in the flow characteristics of the sealant formulation. Examples 8 and 9 show the advantageous effect of using mixtures of solid and liquid epoxy resins on the flow characteristics of the compositions. Comparative Example 3 and Example 9 show the advantageous effect of incorporating polyester into the sealant formulation on E-coat adhesion.

TABLE 2

| Ingredients | Comparative Example 2 | Comparative Example 3 | Example 6 | Example 7 | Example 8 | Example 9 |
|---|---|---|---|---|---|---|
| DYNAPOL ™ S1402 | 59 | 0 | 49 | 30 | 30 | 30 |
| EPON ™ 828 | 15 | 30 | 15 | 15 | 15 | 30 |
| EPOXY Resin A | 15 | 0 | 15 | 15 | 15 | 0 |
| UNILIN ™ 425 wax | 1 | 1 | 1 | 1 | 1 | 1 |
| ELVAX ™ 500 W | 0 | 59 | 10 | 29 | 0 | 29 |
| ELVAX ™ 40 W | 0 | 0 | 0 | 0 | 29 | 0 |
| Dicyandiamide | 7 | 7 | 7 | 7 | 7 | 7 |
| CURAZOL ™ 2-MZ | 3 | 3 | 3 | 3 | 3 | 3 |
| CURED E-COAT ADHESION | Good | Poor | Good | Good | Good | Good |
| UNCURED TENSILE PROPERTIES | | | | | | |
| Tensile Yield (MPa) | 1.48 | 2.24 | 1.25 | 1.25 | 1.07 | 0.50 |
| Yield Elongation (%) | 63 | 12 | 47 | 28 | 68 | 16 |
| Tensile Break (Mpa) | 1.02 | 2.38 | 0.74 | 0.62 | 1.14 | 0.48 |
| Elongation at Break (%) | 280 | 14 | 258 | 112 | 915 | 19 |
| CURED TENSILE PROPERTIES | | | | | | |
| Tensile Yield (MPa) | 6.31 | 5.12 | 6.02 | 2.46 | 3.43 | 1.47 |
| Yield Elongation (%) | 26 | 7 | 3 | 2 | 3 | 1 |
| Tensile Break (Mpa) | 6.02 | 5.05 | 5.98 | 2.46 | 3.41 | 1.46 |
| Elongation at Break (%) | 28 | 7 | 3 | 2 | 3 | 2 |
| CURL TEST | Pass | Fail | Pass | Pass | Pass | Pass |
| 45° FLOW TEST 149° C./ 20 MINUTES | | | | | | |
| Thickness in mm | 1.5 | 1.5 | 1.5 | 1.5 | 1.5 | 1.4 |
| Initial Flow in mm | 136 | 128 | 108 ± 3 | 72 ± 5 | 53 ± 1 | 224 ± 23 |

Examples 10–14

Examples 10 and 11 show the effect of varying the amount of curative used in the sealant formulations of the invention. Example 12 shows that the tack of the composition increased with increasing amounts of liquid epoxy in the sealant formulation. These examples also show the effect of varying the ratio of liquid to solid epoxy on the physical characteristics of composition.

TABLE 3

| Ingredients | Example 10 | Example 11 | Example 12 | Example 13 | Example 14 |
|---|---|---|---|---|---|
| DYNAPOL ™ S1402 | 10 | 10 | 10 | 10 | 10 |
| EPON ™ 828 | 20 | 20 | 10 | 30 | 15 |
| Epoxy Resin A | 20 | 20 | 30 | 10 | 20 |
| HELOXY ™ 84 | 0 | 0 | 0 | 0 | 5 |
| ELVAX ™ 40 W | 44 | 44 | 44 | 44 | 44 |
| Dicyandiamide | 4 | 7 | 4 | 4 | 4 |
| CURAZOL ™ 2-MZ | 2 | 3 | 2 | 2 | 2 |
| THUMB TACK | None | None | None | Some | — |
| UNCURED E-COAT ADHESION | Yes | Yes | Yes | Yes | Yes |
| MANDREL BEND TEST | | | | | |
| 25 mm diameter (−9° C.) | Pass | Fail | Pass | Pass | Pass |
| 25 mm diameter (−28° C.) | Pass | Pass | Pass | Pass | Pass |
| CURED TENSILE PROPERTIES | | | | | |
| Tensile Yield (MPa) | 6.43 | 6.27 | 9.02 | 4.05 | 3.61 |
| Yield Elongation (%) | 16 | 9 | 9 | 92 | 44 |
| Tensile Break (MPa) | 6.33 | 6.23 | 9.00 | 3.75 | 3.47 |
| Elongation at Break (%) | 17 | 10 | 9 | 100 | 48 |
| CURL TEST | Pass | Pass | Pass | Pass | Pass |
| 45° FLOW TEST 149° C./20 MINUTES | | | | | |
| Thickness in mm | 1.1 ± 0 | 1.2 ± 0 | 1.2 ± 0 | 1.1 ± 0 | 1.1 ± 0 |
| Initial Flow in mm | 2 ± 1 | 0 ± 0 | 2 ± 1 | 1 ± 0 | 3 ± 1 |

Example 15

This example illustrates the incorporation of an inorganic filler into a sealant composition. A sealant composition was prepared according to General Procedure B using the amounts of ingredient indicated: 32 parts LEVAPREN™ 700HV EVA polymer, 10 parts Polyester A, 42 parts EPON™ 828 epoxy resin, 15 parts aluminum oxide particles, 1 part $Cp(Xyl)Fe^+SbF_6^-$.

The sealant composition was pressed into a film between two silicone coated transparent polyester release liners, exposed for 5 minutes on each side through the liner using two Philips TLD 15W/03 super diazo bulbs at a distance of about 10 cm, and baked at 177° C. for 20 minutes.

This sealant composition had an average Overlap Shear Strength of 23.3 MPa.

General Procedure For The Preparation Of Sealant Tapes

General Procedure A or B for the preparation of adhesives was used to prepare the desired adhesive composition. A bar coater was used to coat the adhesive between two silicone coated polyester release liners at the desired tape thickness (typically 1.0 and 2.0 mm).

According to this procedure, tapes using the adhesive compositions of Examples 6–14 were prepared in various widths of from 15 cm to 28 cm, and in thicknesses ranging from 1.1 to 1.5 mm. The tapes were wound onto cores to form tape rolls.

Example 16

This example describes the use of a Twin Screw Extruder for making a sealant tape that was subsequently wound up on a core. The following formulation was added to a Werner-Pfleiderer co-rotating 30 mm twin screw extruder (37:1 L:D): 38.0 parts LEVAPREN™ 700, 19.25 parts EPON™ 1001F, 19.25 parts EPON 828, 18.8 parts DYNAPOL™ S1402, 3.3 parts dicyandiamide, and 1.4 parts CURAZOL™ 2MZ-Azine. Extruder conditions were: Screw RPMs=175, Zone 1 temp=38.3° C., Zone 2 temp=60.5° C., zone 3 temp=82.8° C., Zone 4 temp=82.2° C., Zone 5=82.7° C. The material was extruded onto a silicone coated paper release liner with a thickness of 1.75 mm and wound up onto a core.

Example 17

A strip of tape prepared as in Example 16 above was cut using a razor blade. The sample had dimensions of 14.5 mm by 200 mm. The strip was positioned in a simulated roof ditch that was prepared by welding together two 30.5 cm long pieces of L-shaped steel to form a U-shaped channel having an overlap joint in the floor of the channel. The channel had a width of 16.5 mm and a depth of 12 mm along the length of the ditch. The welded ditch was then E-coated by means known in the automotive manufacturing art. The roof ditch containing the sealant tape was heated at a temperature of 177° C. for 20 minutes. The material draped over the seam and effectively sealed the ditch.

What is claimed is:

1. A curable composition formed by mixing components comprising:

a) 10 to 70 weight percent of a curable epoxy resin;

b) an effective amount of a curative for the epoxy resin;

c) 10 to 85 weight percent of a thermoplastic ethylene-vinyl acetate copolymer; and d) 5 to 60 weight percent of a thermoplastic polyester compatibilizing resin, wherein the sum of a), c), and d) above equals 100 weight percent.

2. The curable composition according to claim 1 wherein said composition is a molten mixture.

3. The curable composition according to claim 1 further comprising up to 50 percent by volume of one or more additives that alters the physical characteristics of the resulting cured composition.

4. The curable composition according to claim 1 wherein said composition is an unsupported film.

5. The curable composition according to claim 1 wherein the epoxy resin comprises at least one of an aliphatic, alicyclic, aromatic, and heterocyclic polyepoxide.

6. The curable composition according to claim 1 wherein the curative is at least one of a photocatalyst and a thermal curing agent.

7. The curable composition according to claim 6 wherein the thermal curing agent is selected from the group consisting of aliphatic primary and secondary amines, aromatic primary and secondary amines, aliphatic tertiary amines, aromatic tertiary amines, and mixtures thereof.

8. The curable composition according to claim 6 wherein the thermal curing agent is selected from the group consisting of fluorene diamines, boron trifluoride complexes, imidizoles, hydrazines, guanidines, and mixtures thereof.

9. The curable composition according to claim 1 wherein the thermal curing agent comprises dicyandiamide.

10. The curable composition according to claim 1 wherein said ethylene-vinyl acetate copolymer contains from about 28 to about 80 percent by weight vinyl acetate.

11. The curable composition according to claim 1 further containing a hydroxyl containing material.

12. The curable composition according to claim 1 wherein the composition is applied to a substrate and cured.

13. The cured composition according to claim 12 wherein the substrate is a metal or a polymer.

14. The curable composition according to claim 4 wherein the unsupported film is attached to a substrate and cured.

15. The cured composition of claim 14 used as a protective or decorative coating on a substrate.

16. An article comprising:
   a) a curable composition in the form of a film formed by mixing components comprising:
      i) 10 to 70 weight percent of a curable epoxy resin,
      ii) an effective amount of a curative for the epoxy resin,
      iii) 10 to 85 weight percent of a thermoplastic ethylene-vinyl acetate copolymer, and
      iv) 5 to 60 weight percent of a thermoplastic polyester compatibilizing resin, wherein the sum of i), iii), and iv) above equals 100 weight percent; and
   b) a release liner or a backing attached to said film.

17. The article according to claim 16 wherein the article is a tape or a protected film.

18. The article according to claim 16 provided in a roll construction.

19. The article according to claim 16 further comprising a barrier coating attached to said film opposite said release coating or backing.

20. A method comprising the steps of:
   a) providing a molten mixture including:
      i) 10 to 70 weight percent of a curable epoxy resin,
      ii) an effective amount of a curative for the epoxy resin,
      iii) 10 to 85 weight percent of a thermoplastic ethylene-vinyl acetate copolymer, and
      iv) 5 to 60 weight percent of a thermoplastic polyester compatibilizing resin, wherein the sum of i, iii, and iv equals 100 weight percent;
   b) applying the molten mixture to a substrate for processing into an unsupported film; and
   c) at any subsequent time, activating the curative to produce a cured composition.

21. The method according to claim 20 wherein the molten mixture is processed into a film and further includes the step of applying said film to a substrate.

22. The method of claim 20 wherein the substrate is a metal or a polymer.

23. A curable composition formed by mixing components comprising a molten mixture including:
   a) about 30 to about 50 weight percent of a curable epoxy resin;
   b) an effective amount of a thermal curing agent for the epoxy resin;
   c) about 30 to about 60 weight percent of a thermoplastic ethylene-vinyl acetate copolymer containing at least 40 percent vinyl acetate by weight of the copolymer; and
   d) about 10 to about 30 weight percent of a thermoplastic polyester compatibilizing resin,
wherein the sum of a), c), and d) above equals 100 weight percent.

24. The curable composition according to claim 23 wherein the molten mixture is a homogeneous mixture.

25. The curable composition according to claim 1 wherein said thermoplastic polyester compatibilizing resin prevents phase separation of the ethylene-vinyl acetate copolymer and the epoxy resin when the composition is in a molten state.

26. A curable composition formed by mixing components comprising:
   (a) an effective amount of a curable epoxy resin;
   (b) an effective amount of a curative for the epoxy resin;
   (c) an effective amount of a thermoplastic ethylene-vinyl acetate copolymer; and
   (d) an effective amount of a thermoplastic polyester compatibilizing resin,
wherein the composition his significant tack in the uncured state, good cured adhesion to surface treated metals, low controlled flow during curing, and semi-structural adhesive and cohesive strength in the cured state.

* * * * *